US012335710B2

(12) United States Patent
Mao et al.

(10) Patent No.: US 12,335,710 B2
(45) Date of Patent: Jun. 17, 2025

(54) MULTIFUNCTIONAL SOUNDING DEVICE

(71) Applicant: AAC Technologies (Nanjing) Co., Ltd., Nanjing (CN)

(72) Inventors: Lubin Mao, Nanjing (CN); Ziang Li, Nanjing (CN); Jie Ma, Nanjing (CN); Yun Tang, Nanjing (CN); Dong Lu, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 236 days.

(21) Appl. No.: 18/338,365

(22) Filed: Jun. 21, 2023

(65) Prior Publication Data

US 2024/0205608 A1 Jun. 20, 2024

Related U.S. Application Data

(63) Continuation of application No. PCT/CN2022/139862, filed on Dec. 19, 2022.

(51) Int. Cl.
*H04R 9/04* (2006.01)
*H04R 9/02* (2006.01)
*H04R 9/06* (2006.01)

(52) U.S. Cl.
CPC ............. *H04R 9/046* (2013.01); *H04R 9/025* (2013.01); *H04R 9/06* (2013.01); *H04R 2400/03* (2013.01); *H04R 2400/11* (2013.01)

(58) Field of Classification Search
CPC .......... H04R 9/046; H04R 9/025; H04R 9/06; H04R 2400/03; H04R 2400/11
See application file for complete search history.

(56) References Cited

FOREIGN PATENT DOCUMENTS

CN 115396792 A * 11/2022 ............... H04R 1/24

* cited by examiner

*Primary Examiner* — Tuan D Nguyen
(74) *Attorney, Agent, or Firm* — Wiersch Law Group

(57) ABSTRACT

The multifunctional sounding device provided by the present disclosure includes a housing body, a sounding unit and a vibration assembly. The sounding unit includes a frame, a vibration system fixed on the frame, and a magnetic circuit system that drives the vibration system to vibrate and produce sound in a first direction. The vibrator surrounds the outside of the magnetic circuit system with space. The coil assembly interacts with the magnetic circuit system to drive the vibrator to vibrate in a second direction perpendicular to the first direction. The coil assembly includes an iron core fixed to the vibrator and a coil wrapped around the iron core. The multifunctional sounding device of the present disclosure has a small thickness and low production cost.

10 Claims, 5 Drawing Sheets

B-B

B-B

MULTIFUNCTIONAL SOUNDING DEVICE

TECHNICAL FIELD

The present disclosure relates to the field of electroacoustic transducers, especially to a multifunctional sounding device.

BACKGROUND ART

With the rapid development of the consumer electronics industry, especially smart phones, terminal consumers have higher and higher demands on device experience, and the demand for auditory and tactile experience is gradually increasing. The multifunctional sounding device with vibration function and playing sound is widely used in portable mobile terminal devices.

In the related art, the multifunctional sounding device includes a housing body and a sounding unit accommodated in the housing body and a motor assembly. The sounding unit includes a frame and a vibration system and a magnetic circuit system respectively fixed to the frame. However, the motor assembly is stacked under the sounding unit, which increases the thickness of the multifunctional sounding device, making it difficult to reduce the thickness of the multifunctional sounding device. In addition, the sounding unit and the motor assembly have their own magnets, so that the magnets in the multifunctional sounding device are large in number, high in cost, large in size and unable to be miniaturized. Moreover, the driving forces of the magnetic field interfere and influence each other, so that the acoustic performance and vibration performance of the multifunctional sounding device are poor.

Therefore, it is really necessary to provide a new the multifunctional sounding device to solve the above technical problems.

SUMMARY OF THE INVENTION

The present disclosure is to provide the multifunctional sounding device with the magnetic circuit compact, smaller in size and stronger in vibration function.

In order to achieve the objective mentioned above, the present disclosure provides a multifunctional sounding device including: a housing body with a containment space; a sounding unit accommodated in the containment space, including a frame, a vibration system fixed on the frame, and a magnetic circuit system for driving the vibration system to vibrate and produce sound in a first direction; a vibration assembly received in the accommodation space, including a vibrator suspended in the containment space, a coil assembly mounted on the vibrator and opposite to the magnetic circuit system, and an elastic member supporting the vibrator. The vibrator surrounds and spaces from an outside of the magnetic circuit system. The coil assembly interacts with the magnetic circuit system for driving the vibrator to vibrate in a second direction perpendicular to the first direction; and the coil assembly includes an iron core fixed to the vibrator and a coil wrapped around the iron core.

In addition, the magnetic circuit system includes a first magnet fixed to the housing body and a second magnet arranged spaced from the first magnet for forming a magnetic gap; the coil interacts with the second magnet.

In addition, a wire winding direction of the coil is parallel to the second direction.

In addition, the second magnet includes a first magnetization area, a second magnetization area and a third magnetization area arranged in sequence along the second direction; the magnetization direction of the first magnetization area and the third magnetization area are the same; the magnetization direction of the first magnetization area and the second magnetization area are opposite.

In addition, the vibrator includes a main body having a first main body along a long axis direction and a second main body along a short axis; the iron core is fixed to the first main body.

In addition, the elastic member includes a bottom board supporting the main body, a side board bent and extended from the edge of the bottom board, and an elastic part extending from one end of the side board; the bottom board and the housing body are spaced apart; the elastic part includes a first connection part connected to the side board, a middle elastic part extending from the first connection part along the short axis direction of said main body, and a second fixed part extending from the end of the middle elastic part away from the first connection part to be fixed on the housing body; the middle elastic part and the second main body are spaced apart.

In addition, the vibrator further includes a third main body bent and extended from the edge of the first main body; the third main body is fixed on the surface of the side board away from the housing body.

In addition, the first main body is provided with a notch penetrating therethrough along the first direction; the iron core is accommodated in the notch and fixed on the first main body.

In addition, the magnetic circuit system further includes a first pole core fixed on the side the first magnet near the vibration system and a third magnet fixed on the side of the first pole core facing the vibration system; the first magnet and the third magnet are magnetized along the first direction; the magnetization direction of the first magnet is opposite to that of the third magnet.

In addition, the magnetic circuit system further includes a soft magnet fixed on the side of the second magnet facing the first magnet; two ends of the soft magnets along the second direction are provided with a first magnet respectively.

Compared with related technologies, the multifunctional sounding device provided by the present disclosure includes a housing body with a containment space, a sounding unit accommodated in the containment space and a vibration assembly. The sounding unit includes a frame, a vibration system fixed on the frame, and a magnetic circuit system that drives the vibration system to vibrate and produce sound in a first direction. The vibration assembly includes a vibrator suspended in the containment space, a coil assembly assembled on the vibrator and opposite to the magnetic circuit system, and an elastic member supporting the vibrator. The vibrator surrounds the outside of the magnetic circuit system with space. The coil assembly interacts with the magnetic circuit system to drive the vibrator to vibrate in a second direction perpendicular to the first direction. The coil assembly includes an iron core fixed to the vibrator and a coil wrapped around the iron core. The vibrator fixed with the coil assembly surrounds the peripheral side of the magnetic circuit system. In this way, the multifunctional sounding device is reduced, which is beneficial to the development of miniaturization. The solenoid structure composed of the coil and the iron core is set opposite to the magnetic circuit system to provide the vibration assembly for vibration, used to share the magnetic circuit system with the vibration system of the sound, which reduces the number of the magnet and reduces the production cost.

BRIEF DESCRIPTION OF DRAWINGS

In order to more clearly illustrate the technical solutions in the embodiments of the present invention, the accompanying drawings used in the description of the embodiments will be briefly introduced below. It is apparent that, the accompanying drawings in the following description are only some embodiments of the present invention, and other drawings can be obtained by those of ordinary skill in the art from the provided drawings without creative efforts.

DETAILED DESCRIPTION OF EXEMPLARY EMBODIMENTS

Figure 1:
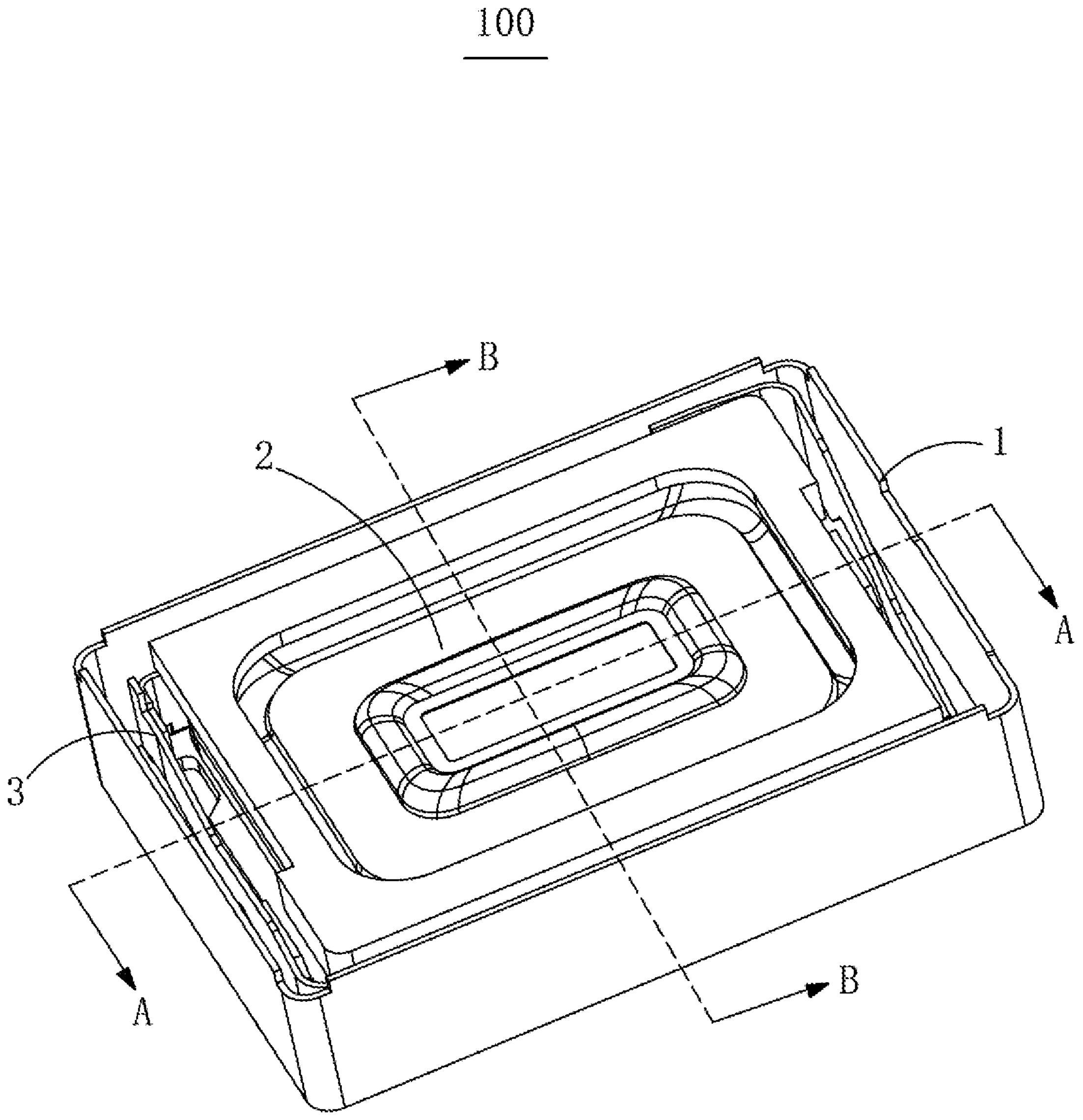
FIG. 1 is an isometric view of a multifunctional sounding device in accordance with an embodiment of the present disclosure.
Figure 2:
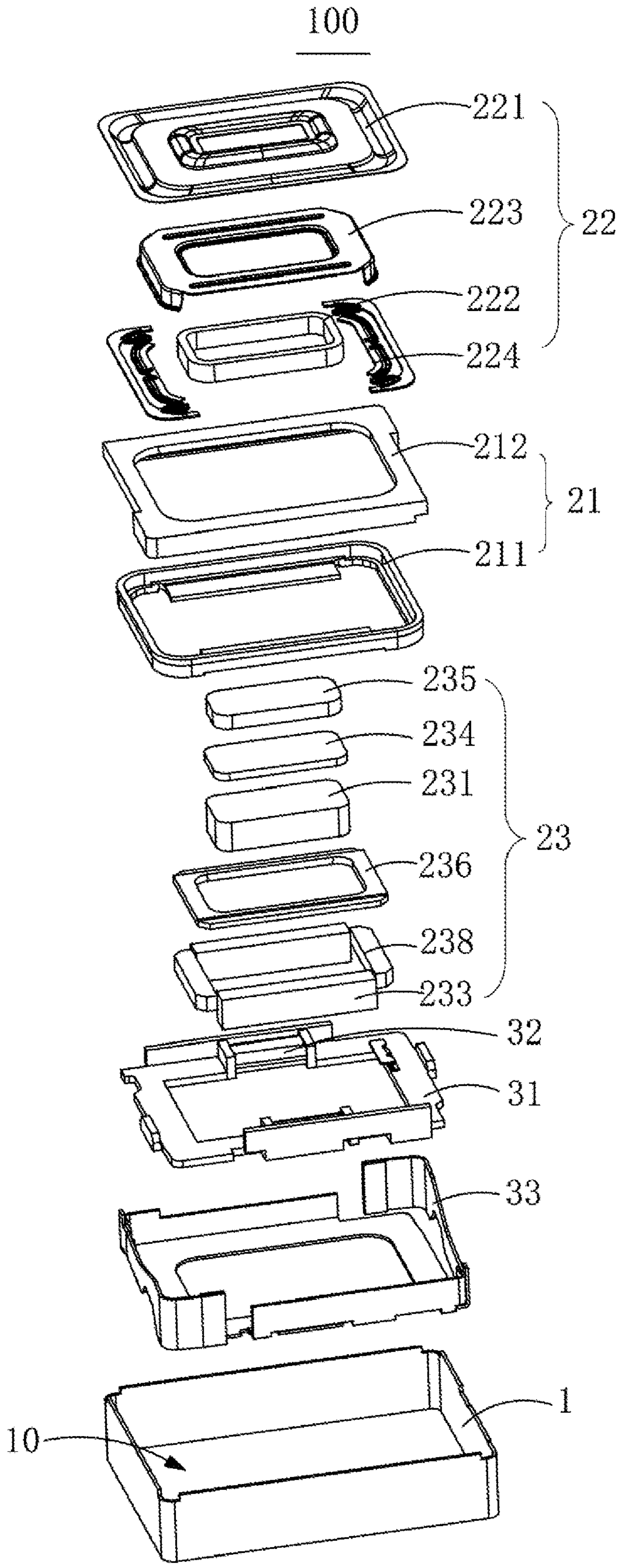
FIG. 2 is an exploded view of the multifunctional sounding device in FIG. 1.
Figure 3:
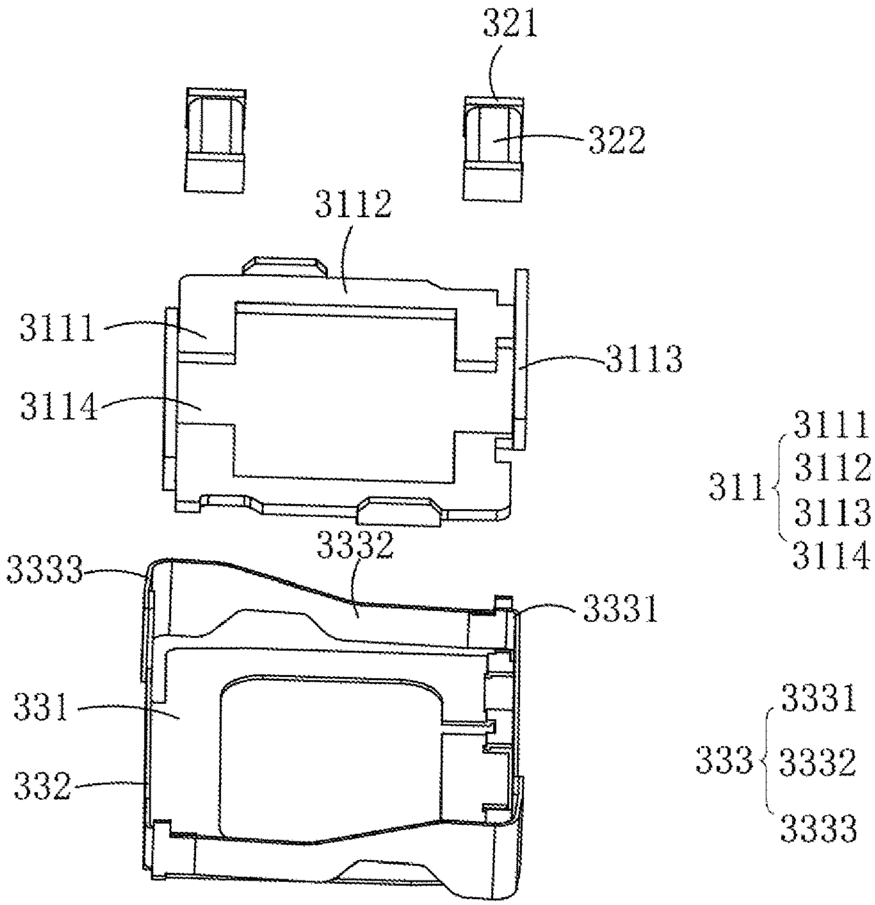
FIG. 3 is an isometric view of a vibration assembly of the multifunctional sounding device in FIG. 1.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

As shown in FIGS. 1-6, the present disclosure provides a multifunctional sounding device 100, which includes a housing body 1 with a containment space 10 and a sounding unit 2 contained in the containment space 10 and a vibration assembly 3.

The sounding unit 2 includes a frame 21, a vibration system 22 fixed to the frame 21, and a magnetic circuit system 23 that drives the vibration system 22 to vibrate in a first direction and produce sound. The vibration system 22 includes a diaphragm 221 fixed to the frame 21, a voice coil 222 fixed to the diaphragm 221, a skeleton 223 supporting the voice coil 222 and a flexible circuit board 224 electrically connected to the voice coil 222. The voice coil 222 drives the diaphragm 221 to vibrate along the first direction X to produce sound. The magnetic circuit system 23 includes a first magnet 231 fixed on the housing body 1, a second magnet 233 spaced on the peripheral side of the first magnet 231 to form the magnetic gap 232, a first pole core 234 fixed on the first magnet 231 near the diaphragm 221 side, a third magnet 235 fixed on the side of the first pole core 234 facing the diaphragm 221, and a second pole core 236 fixed on the side of the second magnet 233 facing the diaphragm 221. It can be understood that the voice coil 222 is in the shape of a racetrack. The second magnet 233 is arranged on the long axis side of the voice coil 222, that is, the second magnet 233 extends along the long axis direction of the voice coil 222.

Further, the middle position of the diaphragm 221 is fixed on the surface of the third magnet 235 away from the first pole core 234. The second pole core 236 is fixed on the frame 21. The frame 21 includes a first bracket 211 fixedly connected with the second pole core 236 and a second bracket 212 fixed above the first bracket 211. The outer edge of the diaphragm 221 is sandwiched between the first bracket 211 and the second bracket 212. The voice coil 222 is inserted into the magnetic gap 232 through the skeleton 223.

The vibration assembly 3 includes a vibrator 31 suspended in the containment space 10, A coil assembly 32 assembled on the vibrator 31 and opposite to the magnetic circuit in system 23, and an elastic member 33 supporting the vibrator 31. The vibrator 31 surrounds the outside of the magnetic circuit system 23 with space. The coil assembly 32 interacts with the magnetic circuit system 23 to drive the vibrator 31 to vibrate along a second direction Y perpendicular to the first direction X. The coil assembly 32 includes an iron core 321 fixed to the vibrator 31 and a coil 322 wrapped around the iron core 321.

The second magnet 233 includes a first magnetization area 2331, a second magnetization area 2332 and a third magnetization area 2333 arranged in sequence along the second direction Y. The magnetization direction of the first magnetization area 2331 and the third magnetization area 2333 are the same. The magnetization directions of the first magnetization area 2331 and the second magnetization area 2332 are opposite. The first magnet 231 and the third magnet 235 are magnetized along the first direction X. The magnetization direction of the first magnet 231 and the third magnet 235 is opposite.

Specifically, the vibrator 31 surrounds outside the second magnet 233. The coil 322 and the second magnet 233 are relatively spaced apart and interact with each other. The wire winding direction of the coil 322 is parallel to the second direction Y.

The vibrator 31 includes a main body 311 which is rectangular, the main body 311 includes a first main body 3111 along the long axis direction, a second main body along the short axis 3112, and a third main body 3113 bent and extended from the edge of the first main body. The iron core 321 is fixed to the first main body 3111. Further, the elastic member 33 includes a bottom board 331 supporting the main body 311, a side board 332 bent and extended from the edge of the bottom board 331, and an elastic part 333 extending from one end of the side board. The bottom board 331 is spaced apart from the housing body 1. The elastic part 333 includes a first connection part 3331 connected to the side board 332, a middle elastic part 3332 extending from the first connection part 3331 along the short axis direction of the main body 311, and a second fixed part 3333 extending from the end of the middle elastic part 3332 away from the first connection part 3331 to be fixed on the housing body 1 The middle elastic part 3332 is spaced apart from the second main body 3112. The third main body 3113 is fixed on the surface of the side board 332 away from the housing body 1.

Further, the first main body 3111 is provided with a notch 3114 penetrating therethrough along the first direction X. The iron core 321 is accommodated in the notch 3114 and fixed to the first main body 3111.

Since the second magnet 233 is a three section magnetized structure, in order to avoid the first magnetization area

Figure 7:
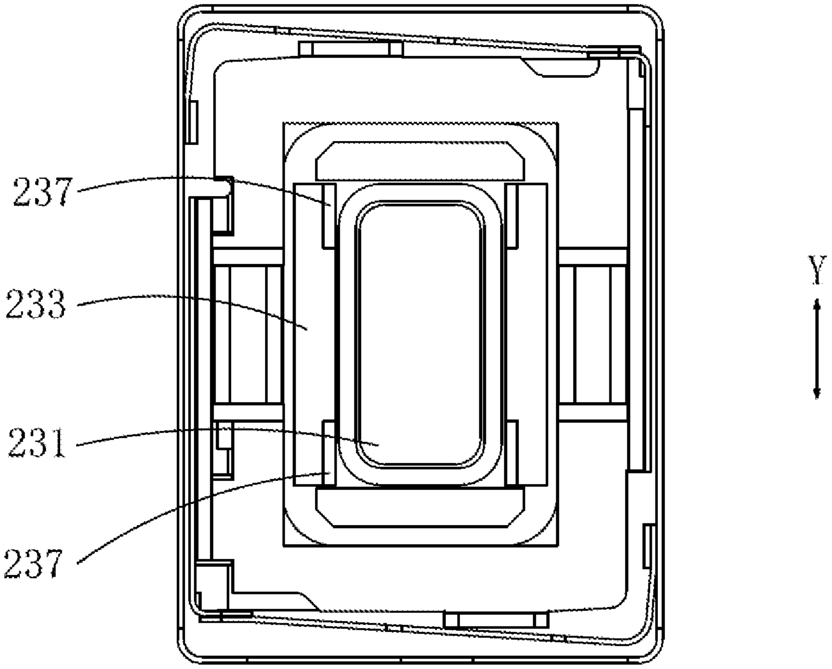
FIG. 7 is an isometric view of a multifunctional sounding device in accordance with another embodiment of the present disclosure.

2331 and the third magnetization area 2333 from canceling out the driving force of the sounding unit 2, as shown in FIG. 7, the magnetic circuit system 23 in another embodiment of the present disclosure further includes a soft magnet 237 fixed on the side of the second magnet 233 facing the first magnet 231. It can be understood that, the soft magnet 237 is provided at both ends of the first magnet 231 along the second direction Y, so as to reduce the driving force loss of the sounding unit 2.

Figure 4:
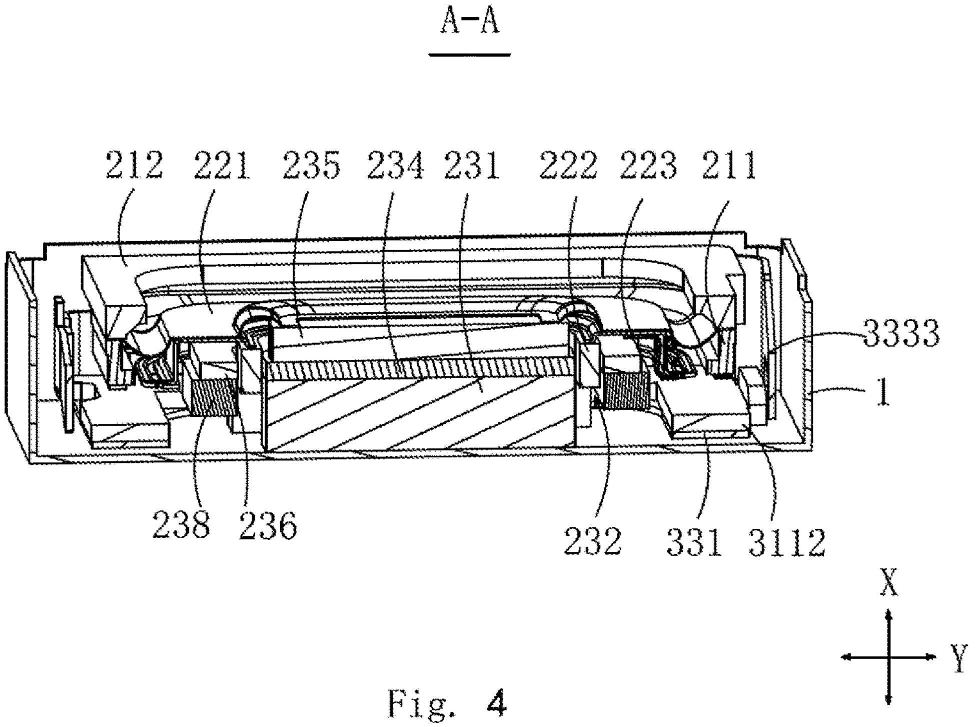
FIG. 4 is a cross-sectional view of the multifunctional sounding device taken along line AA in FIG. 1.
Figure 5:
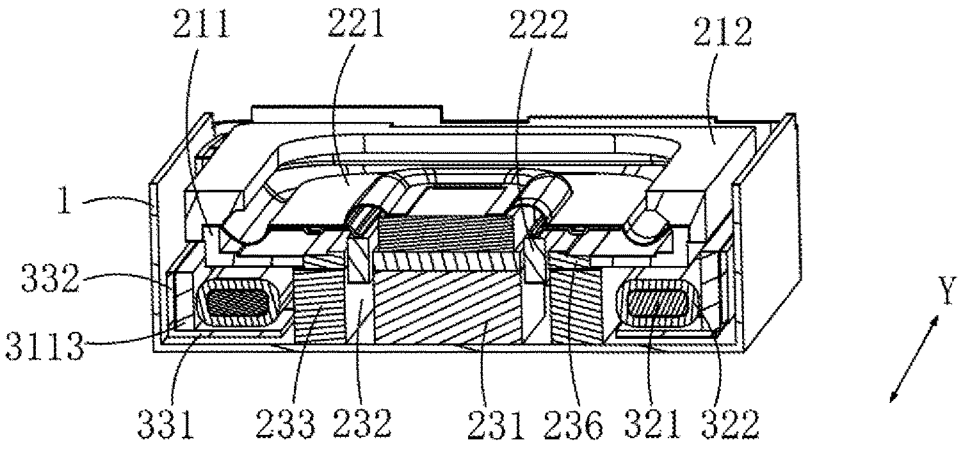
FIG. 5 is a cross-sectional view of the multifunctional sounding device along line BB in FIG. 1.
Figure 6:
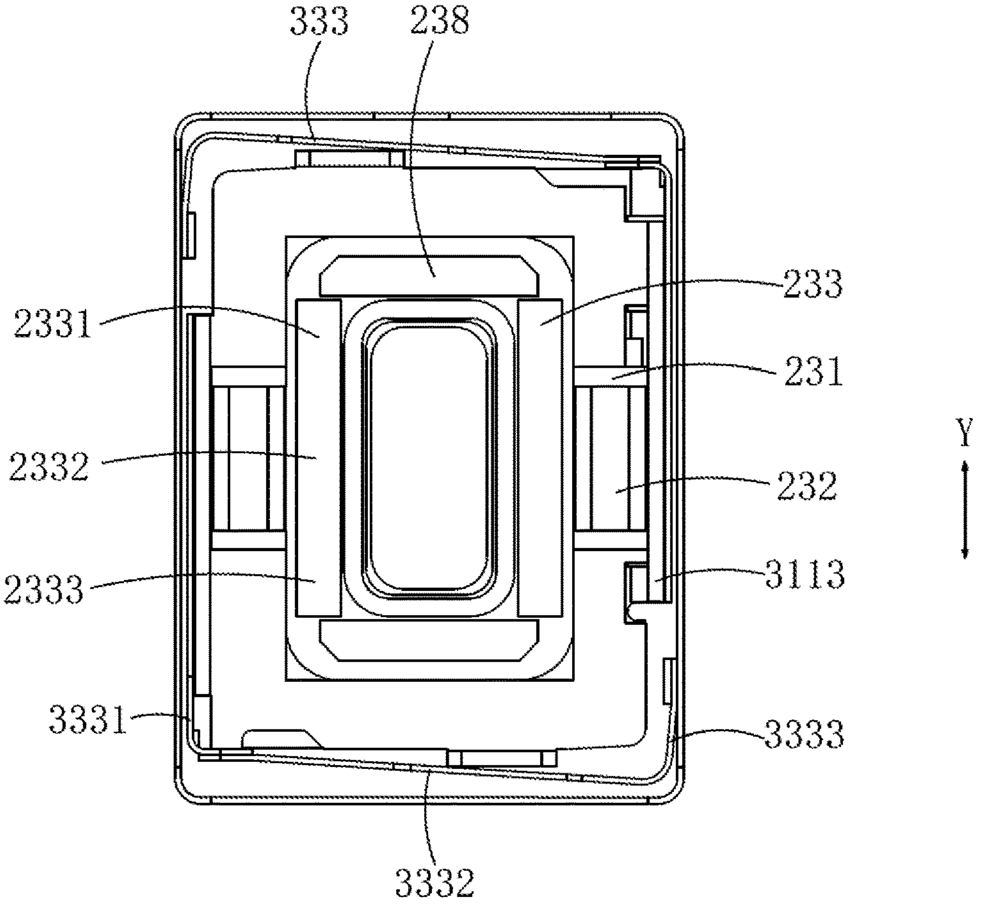
FIG. 6 is a partially exploded view of the multifunctional sounding device in FIG. 1.

In order to further enhance the magnetic field performance of the magnetic circuit system 23, the magnetic circuit system 23 also includes a fourth magnet 238 is arranged to the peripheral side of the first magnet 231 with space, and the fourth magnet 238 is located on the short axis side of the voice coil 222. It can be understood that, as shown in FIG. 4, the fourth magnet 238 is disposed at both ends of the first magnet 231 along the long axis direction (ie, both ends along the second direction Y). In order to prevent the vibrator 31 from colliding with the fourth magnet 238 when vibrating along the second direction Y, the fourth magnet 238 is fixed on the surface of the second pole core 236 away from the diaphragm 221. Besides, along the first direction X, the thickness of the fourth magnet 238 is smaller than the thickness of the second magnet 233. That is, the fourth magnet 238 is suspended in the containment space 10 and is not fixed to the housing body 1.

Compared with related technologies, the multifunctional sounding device provided by the present disclosure includes a housing body with a containment space, a sounding unit accommodated in the containment space and a vibration assembly. The sounding unit includes a frame, a vibration system fixed on the frame, and a magnetic circuit system that drives the vibration system to vibrate and produce sound in a first direction. The vibration assembly includes a vibrator suspended in the containment space, a coil assembly assembled on the vibrator and opposite to the magnetic circuit system, and an elastic member supporting the vibrator. The vibrator surrounds the outside of the magnetic circuit system with space. The coil assembly interacts with the magnetic circuit system to drive the vibrator to vibrate in a second direction perpendicular to the first direction. The coil assembly includes an iron core fixed to the vibrator and a coil wrapped around the iron core. The vibrator fixed with the coil assembly surrounds the peripheral side of the magnetic circuit system. In this way, the multifunctional sounding device is reduced, which is beneficial to the development of miniaturization. The solenoid structure composed of the coil and the iron core is set opposite to the magnetic circuit system to provide the vibration assembly for vibration, used to share the magnetic circuit system with the vibration system of the sound, which reduces the number of the magnet and reduces the production cost.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional sounding device, including:

a housing body with a containment space;

a sounding unit accommodated in the containment space, including a frame, a vibration system fixed on the frame, and a magnetic circuit system for driving the vibration system to vibrate and produce sound in a first direction;

a vibration assembly received in the containment space, including a vibrator suspended in the containment space, a coil assembly mounted on the vibrator and opposite to the magnetic circuit system, and an elastic member supporting the vibrator; wherein the vibrator surrounds and spaces from an outside of the magnetic circuit system; the coil assembly interacts with the magnetic circuit system for driving the vibrator to vibrate in a second direction perpendicular to the first direction; and the coil assembly includes an iron core fixed to the vibrator and a coil wrapped around the iron core.

2. The multifunctional sounding device as described in claim 1, wherein, the magnetic circuit system includes a first magnet fixed to the housing body and a second magnet arranged spaced from the first magnet for forming a magnetic gap; the coil interacts with the second magnet.

3. The multifunctional sounding device as described in claim 2, wherein, a wire winding direction of the coil is parallel to the second direction.

4. The multifunctional sounding device as described in claim 3, wherein, the second magnet includes a first magnetization area, a second magnetization area and a third magnetization area arranged in sequence along the second direction; the magnetization direction of the first magnetization area and the third magnetization area are the same; the magnetization direction of the first magnetization area and the second magnetization area are opposite.

5. The multifunctional sounding device as described in claim 2, wherein, the magnetic circuit system further includes a first pole core fixed on the side the first magnet near the vibration system and a third magnet fixed on the side of the first pole core facing the vibration system; the first magnet and the third magnet are magnetized along the first direction; the magnetization direction of the first magnet is opposite to that of the third magnet.

6. The multifunctional sounding device as described in claim 2, wherein, the magnetic circuit system further includes a soft magnet fixed on the side of the second magnet facing the first magnet; two ends of the soft magnets along the second direction are provided with a first magnet respectively.

7. The multifunctional sounding device as described in claim 1, wherein, the vibrator includes a main body having a first main body along a long axis direction and a second main body along a short axis; the iron core is fixed to the first main body.

8. The multifunctional sounding device as described in claim 7, wherein, the elastic member includes a bottom board supporting the main body, a side board bent and extended from the edge of the bottom board, and an elastic part extending from one end of the side board; the bottom board and the housing body are spaced apart; the elastic part includes a first connection part connected to the side board, a middle elastic part extending from the first connection part along the short axis direction of said main body, and a second fixed part extending from the end of the middle elastic part away from the first connection part to be fixed on the housing body; the middle elastic part and the second main body are spaced apart.

9. The multifunctional sounding device as described in claim 8, wherein, the vibrator further includes a third main body bent and extended from the edge of the first main body; the third main body is fixed on the surface of the side board away from the housing body.

10. The multifunctional sounding device as described in claim 9, wherein, the first main body is provided with a notch penetrating therethrough along the first direction; the iron core is accommodated in the notch and fixed on the first main body.

* * * * *